US012561638B2

(12) United States Patent
Shah

(10) Patent No.: US 12,561,638 B2
(45) Date of Patent: Feb. 24, 2026

(54) INTERACTIVE SYSTEM FOR PLANNING FUTURE SHIPMENTS

(71) Applicant: CARRIER CORPORATION, Palm Beach Gardens, FL (US)

(72) Inventor: Mihir Shah, The Hague (NL)

(73) Assignee: CARRIER CORPORATION, Palm Beach Gardens, FL (US)

( * ) Notice: Subject to any disclaimer, the term of this patent is extended or adjusted under 35 U.S.C. 154(b) by 320 days.

(21) Appl. No.: 17/252,950

(22) PCT Filed: Nov. 26, 2019

(86) PCT No.: PCT/US2019/063220
§ 371 (c)(1),
(2) Date: Dec. 16, 2020

(87) PCT Pub. No.: WO2020/131323
PCT Pub. Date: Jun. 25, 2020

(65) Prior Publication Data
US 2021/0158284 A1 May 27, 2021

Related U.S. Application Data

(60) Provisional application No. 62/782,787, filed on Nov. 26, 2019.

(51) Int. Cl.
*G06Q 10/08* (2024.01)
*G06F 16/2457* (2019.01)
(Continued)

(52) U.S. Cl.
CPC ..... *G06Q 10/0835* (2013.01); *G06F 16/2457* (2019.01); *G06Q 10/0838* (2013.01)

(58) Field of Classification Search
None
See application file for complete search history.

(56) References Cited

U.S. PATENT DOCUMENTS 3,359,752 A * 12/1967 Westling ............ B60H 1/00295
62/239
7,246,080 B2 7/2007 Feldman et al.
(Continued)

FOREIGN PATENT DOCUMENTS

WO 01/08038 A2 2/2001

OTHER PUBLICATIONS

Meyer, Tom, Jun. 27, 1945, Prospective Improvements in Trucking Perishables, Proceedings of the Annual Meeting (Western Farm Economics Association), vol. 18, pp. 119-122 (Year: 1945).*
(Continued)

*Primary Examiner* — Christopher Gomez
(74) *Attorney, Agent, or Firm* — Carlson, Gaskey & Olds, P.C.

(57) ABSTRACT
A system for advising a user regarding a potential shipment includes a user interface for receiving user input regarding a plurality of characteristics of the potential shipment. The user inputs at least one of the characteristics and the system suggests others of the characteristics. A processor determines whether the characteristics of the user input in combination indicate or correspond to at least one issue that is likely to occur during the shipment and, when there is at least one issue that is likely to occur during the shipment, determines an expected impact that the at least one issue will have on the shipment. An output provided to the user indicates the expected impact. Such issues and associated impacts may be determined multiple times while the user enters or selects different characteristics.

20 Claims, 2 Drawing Sheets

(51) Int. Cl.
*G06Q 10/083* (2023.01)
*G06Q 10/0835* (2023.01)

(56) References Cited

U.S. PATENT DOCUMENTS

| | | | |
|---|---|---|---|
| 7,426,499 B2 | 9/2008 | Eder | |
| 7,765,120 B2 | 7/2010 | Yadappanavar et al. | |
| 8,000,988 B1 | 8/2011 | Bezanson et al. | |
| 8,700,443 B1 | 4/2014 | Murray et al. | |
| 9,230,233 B1 * | 1/2016 | Sundaresan | G06Q 50/40 |
| 9,928,475 B2 | 3/2018 | Burnett | |
| 9,971,981 B2 | 5/2018 | Crane, Jr. et al. | |
| 10,026,049 B2 | 7/2018 | Asenjo et al. | |
| 2002/0178077 A1 | 11/2002 | Katz et al. | |
| 2003/0018490 A1 | 1/2003 | Magers et al. | |
| 2003/0033179 A1 | 2/2003 | Katz et al. | |
| 2005/0071207 A1 | 3/2005 | Clark et al. | |
| 2006/0100920 A1 | 5/2006 | Pretorius et al. | |
| 2010/0125487 A1 | 5/2010 | Sinclair et al. | |
| 2010/0185476 A1 | 7/2010 | Eager | |
| 2011/0225023 A1 | 9/2011 | Evens et al. | |
| 2013/0018696 A1 | 1/2013 | Meldrum | |
| 2013/0085801 A1 | 4/2013 | Sharpe et al. | |
| 2014/0012772 A1 | 1/2014 | Pretorius | |
| 2015/0046361 A1 | 2/2015 | Williams et al. | |
| 2016/0042318 A1 | 2/2016 | Goodman et al. | |
| 2016/0203425 A1 | 7/2016 | Ruparel et al. | |
| 2016/0232637 A1 | 8/2016 | Motohashi et al. | |
| 2017/0083856 A1 * | 3/2017 | Song | G06Q 10/0832 |
| 2018/0024554 A1 * | 1/2018 | Brady | G06Q 10/0833 |
| | | | 701/23 |
| 2019/0114714 A1 * | 4/2019 | Jones | H04W 4/026 |
| 2020/0005227 A1 * | 1/2020 | Su | G06Q 10/087 |
| 2020/0211130 A1 * | 7/2020 | Zanaroli | B65G 1/065 |
| 2021/0158272 A1 * | 5/2021 | Barr | G06Q 10/087 |
| 2022/0036021 A1 * | 2/2022 | Burchell | G04F 10/00 |

OTHER PUBLICATIONS

Meyer, Tom, Jun. 27, 1945, Prospective Improvements in Trucking Perishables, Proceedings of the Annual Meeting (West Farm Economics Association), vol. 18, pp. 119-122 (Year: 1945).*
International Preliminary Report on Patentability for International application No. PCT/US2019/063220 dated Jul. 1, 2021.
International Search Report and Written Opinion for International application No. PCT/US2019/063220 dated Mar. 2, 2020.
JPO Office Action, Notice of Reasons for Rejection, JP Application No. 2020-570964 dated Mar. 1, 2022.
Kulak et al. (Mar. 20, 2018). A decision making tool considering risk assessment of sub-contracting agents for an air cargo shipment planning problem. Journal of Air Transport Management. https://www.sciencedirect.com/science/article/abs/pii/S0969699715300156?via%3Dihub.

* cited by examiner

22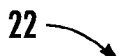

TRIP PLANNER/SIMULATION

INPUT

| | |
|---|---|
| ESTIMATED DEPARTURE DATE | 10/31/2018 |
| PLANNED ARRIVAL DATE | 11/11/2018 |
| CHOOSE PRODUCT | UNKNOWN |
| INITIAL PRODUCT LIFE | 99% |
| CHOOSE WEATHER CONDITIONS | GOOD |
| CHOOSE TRAFFIC CONDITIONS | GOOD |
| PRODUCT STABILITY/PRODUCT LIFE (IN DAYS) | 365.00 |
| CHOOSE SUPPLIER | RAW MATERIAL SUPPLIER |
| CHOOSE RECEIVER | MASSACHUSETTS |
| ESTIMATED ARRIVAL TIME | 13 DAYS 10 HOURS |
| CHOOSE CARRIER, HOUR OF START, HOUR OF END, PACKAGING TYPE, MODE OF TRANSPORT, SERVICE LEVEL, HANDLING | SOME VALUE |

_52_

ESTIMATED IMPACT (IN %)

| | |
|---|---|
| RESULTANT IMPACT | 9.24% |
| PRODUCT LIFE AT SUPPLIER | 99.00% |
| PRODUCT LIFE AT RECEIVER | 89.85% |
| LOSS OF LIFE ON ROAD | 9.15% |

_56_

ESTIMATED IMPACT (IN DAYS)

| | |
|---|---|
| PRODUCT STABILITY/SHELF LIFE AT SUPPLIER (IN DAYS) | 361.35 |
| PRODUCT STABILITY/SHELF LIFE AT RECEIVER (IN DAYS) | 327.97 |
| TOTAL SHIPMENT DURATION (IN DAYS)  _58_ | 11 |
| PRODUCT STABILITY/SHELF LIFE LOST (IN DAYS) | 33.38 |

---

CREATE SHIPMENT

ISSUE GROUP

TEMPERATURE

ISSUE GROUP

- COOLING ISSUE
- HIGH MAX TEMPERATURE
- HIGH MIN TEMPERATURE
- HIGH STANDARD DEVIATIONS
- LOWER LIMIT BREACHED
- MONITOR STARTED EARLIER/POTE...
- MONITOR STOPPER LATE/POTENTI...
- POTENTIAL ARRIVAL SPIKE
- POTENTIAL PRECOOLING ISSUE
- UN-EVEN COOLING
- UPPER LIMIT BREACHED

INTERACTIVE SYSTEM FOR PLANNING FUTURE SHIPMENTS

CROSS REFERENCE TO RELATED APPLICATIONS

This application claims priority to U.S. Provisional Application No. 62/782,787, which was filed on Dec. 20, 2018, and is incorporated herein by reference.

BACKGROUND

Various factors affect performance and results during transit including the tendencies of a carrier or shipping company and the conditions along a shipment route. Some aspects of shipper performance may have an adverse effect on the shipped items in some cases. The reasons why some shipments are successful or satisfactory and others are not can be varied and complex.

While various proposals have been made and various products or services are available to monitor the conditions of a vehicle or within a shipping container during a shipment most of them merely provide information as a basic or straightforward report of the measured conditions. None of them provide prospective, planning information regarding issues that may arise for future shipments.

SUMMARY

An illustrative method of advising a user regarding a potential shipment includes receiving user input regarding at least one of a plurality of characteristics of the potential shipment; suggesting others of the characteristics to the user; receiving additional user input based on a user selection of at least one of the suggested others; determining whether the characteristics of the user input in combination indicate or correspond to at least one issue that is likely to occur during the shipment; when there is at least one issue that is likely to occur during the shipment, determining an expected impact that the at least one issue will have on the shipment; and providing an output to the user indicating the determined expected impact. The plurality of characteristics includes at least some of an identity of a supplier, an identity of a carrier, an identity of a receiver, an indication of a product to be shipped, an origin and a destination of the shipment, a desired beginning date for the shipment, an expected completion date for the shipment, an indication of a mode of transportation, and at least one characteristic indicative of a life expectancy of the product.

In an example embodiment having one or more features of the method of the previous paragraph, the plurality of characteristics has a total number of characteristics, determining whether the characteristics of the user input in combination indicate or correspond to at least one issue that is likely to occur during the shipment is performed when less than the total number of characteristics are included in the user input, and determining the expected impact that the at least one issue will have on the shipment is performed each time that at least one issue is determined.

In an example embodiment having one or more features of the method of any of the previous paragraphs, determining whether the characteristics of the user input in combination indicate or correspond to at least one issue that is likely to occur during the shipment and determining the expected impact that the at least one issue will have on the shipment is performed multiple times for the potential shipment before the total number of characteristics are included in the user input.

An example embodiment having one or more features of the method of any of the previous paragraphs includes providing the output to the user indicating the expected impact and indication the corresponding issue each time that a change in the user input results in a change in the at least one issue and the impact.

An example embodiment having one or more features of the method of any of the previous paragraphs includes determining a primary one of the characteristics that contributes most to the at least one issue; and providing an indication of the primary one the characteristics in the output.

An example embodiment having one or more features of the method of any of the previous paragraphs includes determining an alternative characteristic corresponding to the primary one of the characteristics, wherein the alternative characteristic reduces a likelihood for the at least one issue to occur during the shipment; determining an alternative impact based on the alternative characteristic; providing an indication of the alternative characteristic in the output; and providing an indication of the alternative impact in the output.

An example embodiment having one or more features of the method of any of the previous paragraphs includes determining a category that the at least one issue fits within; providing an indication of the determined category in the output; and providing an indication of other potential issues that fit within the determined category.

In an example embodiment having one or more features of the method of any of the previous paragraphs, the at least one characteristic indicative of a life expectancy of the product is based on a temperature of the product during the shipment, the mode of transportation includes a temperature-controlled container, and the at least one issue includes the temperature of the product during the shipment.

An example embodiment having one or more features of the method of any of the previous paragraphs includes receiving further user input indicating instructions from the user for the shipment to address the at least one issue that is likely to occur during the shipment; and including an indication of the instructions with the output.

In an example embodiment having one or more features of the method of any of the previous paragraphs, suggesting others of the characteristics comprises suggesting a plurality of options for each of the characteristics in a predetermined sequence of the characteristics and receiving the additional user input for the each of the suggested characteristics occurs before suggesting the plurality of options for a next one of the characteristics in the predetermined sequence.

An illustrative example system for advising a user regarding a potential shipment includes a database containing information regarding a plurality of shipments. A user interface is configured to allow the user to enter user input including at least one of a plurality of characteristics of the potential shipment, suggest others of the characteristics to the user, and allow the user to add to the user input by selecting at least one of the suggested others. A processor accesses the information in the database and the characteristics entered through the user input and is configured to determine whether the characteristics of the user input in combination indicate or correspond to at least one issue that is likely to occur during the shipment; when there is at least one issue that is likely to occur during the shipment, determine an expected impact that the at least one issue will have on the shipment; and provide an output to the user indicating the determined expected impact. The plurality of characteristics includes at least some of an identity of a supplier, an identity of a carrier, an identity of a receiver, an indication of a product to be shipped, an origin and a destination of the shipment, a desired beginning date for the shipment, an expected completion date for the shipment, an indication of a mode of transportation, and at least one characteristic indicative of a life expectancy of the product.

In an example embodiment having one or more features of the system of the previous paragraph, the plurality of characteristics has a total number of characteristics, the processor is configured to determine whether the characteristics of the user input in combination indicate or correspond to at least one issue that is likely to occur during the shipment is performed when less than the total number of characteristics are included in the user input, and the processor is configured to determine the expected impact that the at least one issue will have on the shipment is performed each time that at least one issue is determined.

In an example embodiment having one or more features of the system of any of the previous paragraphs, the processor is configured to determine whether the characteristics of the user input in combination indicate or correspond to at least one issue that is likely to occur during the shipment and determining the expected impact that the at least one issue will have on the shipment is performed multiple times for the potential shipment before the total number of characteristics are included in the user input.

In an example embodiment having one or more features of the system of any of the previous paragraphs, the processor is configured to provide the output to the user indicating the expected impact and indication the corresponding issue each time that a change in the user input results in a change in the at least one issue and the impact.

In an example embodiment having one or more features of the system of any of the previous paragraphs, the processor is configured to determine a primary one of the received characteristics that contributes most to the at least one issue and provide an indication of the primary one the received characteristics in the output.

In an example embodiment having one or more features of the system of any of the previous paragraphs, the processor is configured to determine an alternative characteristic corresponding to the primary one of the received characteristics, wherein the alternative characteristic reduces a likelihood for the at least one issue to occur during the shipment; determine an alternative impact based on the alternative characteristic; provide an indication of the alternative characteristic in the output; and provide an indication of the alternative impact in the output.

In an example embodiment having one or more features of the system of any of the previous paragraphs, the processor is configured to determine a category that the at least one issue fits within, provide an indication of the determined category in the output, and provide an indication of other potential issues that fit within the determined category.

In an example embodiment having one or more features of the system of any of the previous paragraphs, the at least one characteristic indicative of a life expectancy of the product is based on a temperature of the product during the shipment, the mode of transportation includes a temperature-controlled container, and the at least one issue includes the temperature of the product during the shipment.

In an example embodiment having one or more features of the system of any of the previous paragraphs, the user interface is configured to receive instructions from the user for the shipment to address the at least one issue that is likely to occur during the shipment and the processor is configured to include an indication of the instructions with the output.

In an example embodiment having one or more features of the system of any of the previous paragraphs, the user interface is configured to suggest the others of the characteristics by suggesting a plurality of options for each of the characteristics in a predetermined sequence of the characteristics, and receive the user input regarding the each of the suggested characteristics before suggesting the plurality of options for a next one of the characteristics in the predetermined sequence.

The various features and advantages of at least one disclosed example embodiment will become apparent to those skilled in the art from the following detailed description. The drawings that accompany the detailed description can be briefly described as follows.

BRIEF DESCRIPTION OF THE DRAWINGS

FIG. 3 schematically illustrates features of an example user interface device.

DETAILED DESCRIPTION

Embodiments of this invention include a system that provides information to a user contemplating a shipment of goods. The user inputs characteristics of the shipment and the system identifies any potential issues that may occur during the shipment based on a combination of the characteristics received from the user and information regarding previous shipments having similar or related characteristics. The system also determines an expected impact any identified issue will have on the shipment or the goods. The system prompts the user to select certain of the characteristics and may present multiple options for each characteristic. The determination regarding potential issues and an associated impact may occur multiple times during the process of the user providing input even before all of the characteristics for a potential shipment have been entered.

Figure 1:
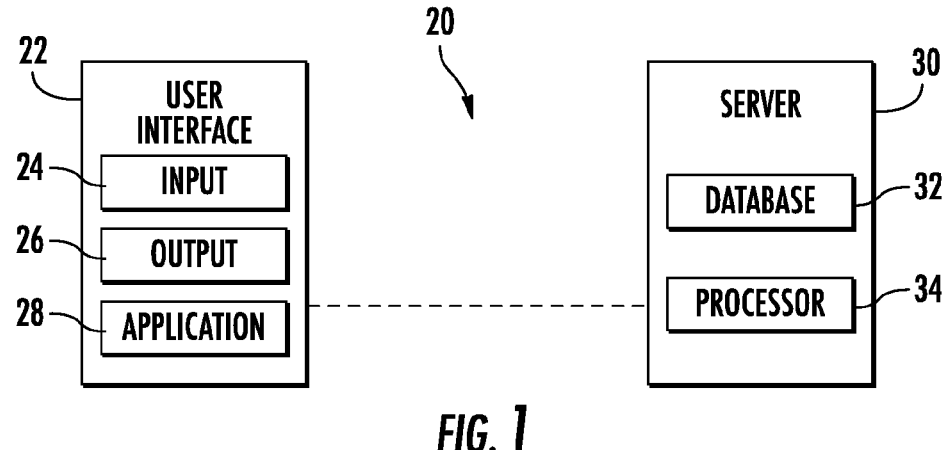
FIG. 1 schematically illustrates a system designed according to an embodiment of this invention.

FIG. 1 schematically illustrates a system 20 for advising a user regarding a potential shipment. A user interface 22 comprises at least one device that includes an input portion 24 and an output portion 26. The input portion 24 allows a user to enter a plurality of characteristics regarding a potential or contemplated shipment. The output portion provides information to the user through, for example, a visual display of the information.

The user interface 22 includes or has access to at least one application that, when run, configures the user interface 22 to communicate with a server 30 that is located remotely from the user interface 22. The server includes a database 32 that contains information regarding previous shipments including information regarding a plurality of characteristics of each shipment and any issues that occurred on each shipment. The server 30 includes a processor 34 that comprise at least one computing device that is configured to receive user input regarding a plurality of characteristics of an intended shipment and to determine whether the combination of those characteristics makes it likely that there will be an issue on the intended shipment. The processor 34 uses information from the database 32 regarding previous shipments that have the same or related characteristics and issues on such previous shipments to determine whether any of those issues are likely to occur on the intended shipment.

The processor 34 is also configured to determine an impact that any identified issue will have on the shipment. An example impact is the effect on a life expectancy, such as shelf-life, that the identified issue may have. In some embodiments the processor 34 is configured to estimate the impact based on information from the user regarding the life expectancy and a relationship determined by the processor 34 between the identified issue and the product.

The server 30 comprises one or more computing devices and the database 32 and the processor 34 need not be realized through the same hardware or a single device. As those skilled in the art who have the benefit of this description will realize, the server 30, the database 32 and the processor 34 may be embodied through a plurality of distinct devices and may be part of a cloud computing system, for example.

Figure 2:
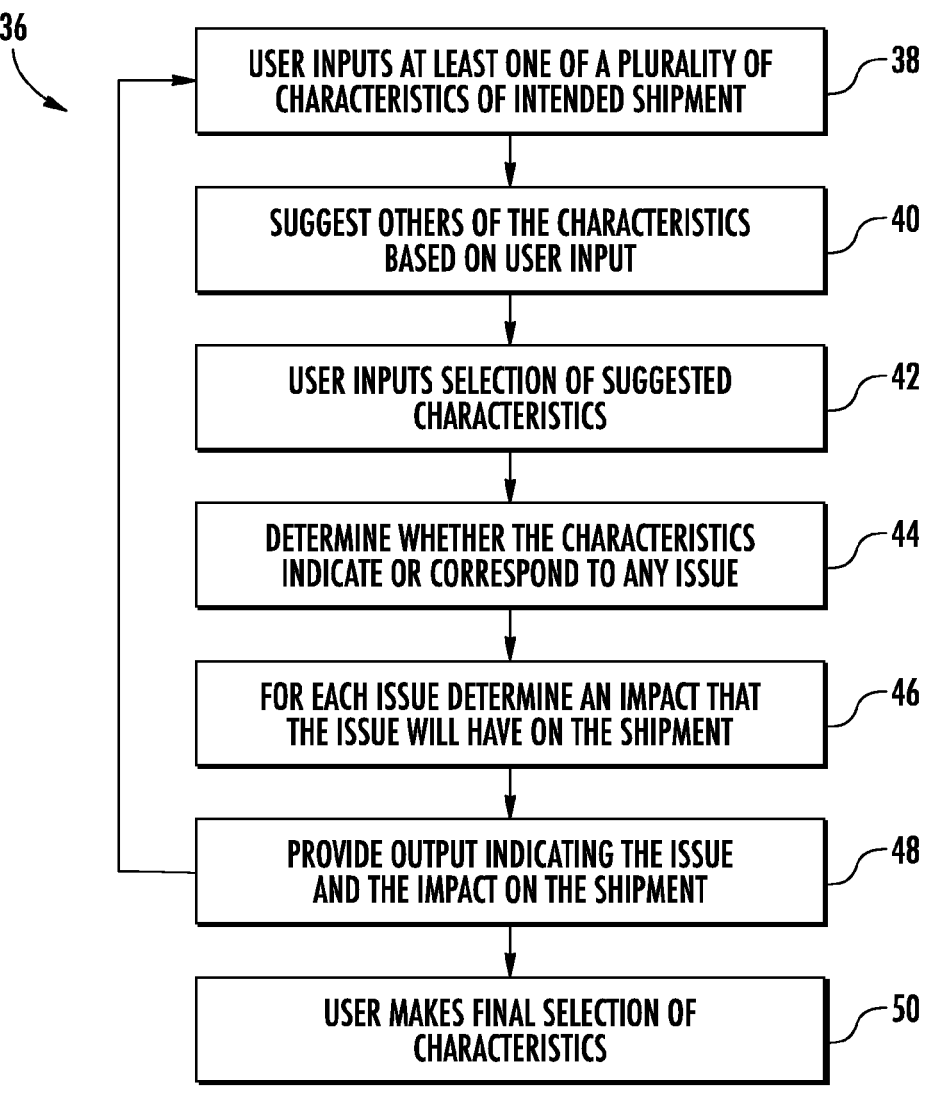
FIG. 2 is a flow chart diagram summarizing an example method designed according to an embodiment of this invention.

FIG. 2 is a flow chart diagram 36 summarizing an example method of providing a user information regarding an intended shipment. At 38 the user enters information regarding at least one of a plurality of characteristics of the shipment through the input portion 24 of the user interface 22. The processor 34 identifies the characteristic of the user input and at 40 suggests at least one other characteristic through the user interface 22. At 42 the user provides additional user input by selecting a suggested characteristic. In many embodiments there are several possible choices for each characteristic.

The user interface 22 is configured to allow the user to provide user input regarding the characteristics of the intended shipment in a predetermined series or sequence. The example embodiment includes presenting or suggesting additional characteristics in the series, receiving additional user input regarding a selected characteristic, and suggesting a next one of the characteristics until some user input has been received for all of the predetermined sequence. In some instances the user may be able to choose to leave a characteristic undefined.

Once the server 30 receives at least some of the characteristics of the user input, at 44 the processor 34 determines whether the combination of characteristics indicates that an issue is likely to occur on the shipment. At 46 the processor determines an impact of any identified issue. At 48 the processor 34 provides an output regarding the identified issue and the estimated impact, which is communicated to the user interface device and available through the output portion 26.

In some embodiments the processor 34 is configured to identify potential issues after each characteristic is entered by the user when possible. For example, if the user enters a product and chooses a shipping company, the processor 34 may determine that the selected shipping company has had issues when transporting that product. The output portion 26 provides an indication of such an issue and the user is allowed to select another shipping company from among a plurality of options presented by the user interface 22.

In addition to providing an output indicating the issue and the impact at 48, the user interface 22 presents potential adjustments or instructions for a carrier that can address the issue and lessen the impact. The processor 34 may determine a revised likelihood for the issue to occur with such an adjustment or instruction and determines a revised impact. Such information is presented at 48 and, when the user selects to include that as part of the shipment, included with an output to the shipper or entity responsible for following that instruction.

The process schematically shown in FIG. 2 includes repeatedly determining whether an issue may occur throughout the process of receiving the user input. Even before all characteristics of the shipment are entered the processor 34 determines possible issues and the associated impacts and provides a corresponding output through the user interface 22. The user is also presented with alternative choices for characteristics and, if selected, with a revised output indicating how the potential issues or impact would change when the alternative characteristic is included for the shipment.

The loop from 48 to 38 in FIG. 2 may occur multiple times during the process as the user enters the characteristics and selects suggested characteristics until the user makes a final selection of the total number of characteristics for the shipment at 50. At that time the output informs the user of any likely issues that may occur during the shipment and the associated impact.

FIG. 3 shows an example display of the user interface device 22. An input portion 52 includes information provided by the user regarding the characteristics of the intended shipment. In this example, the user first provides information regarding an anticipated or estimated departure date when the shipment will begin and an estimated arrival date when the shipment will be complete. The user interface 22 then presents options to the user for selecting a product or allows the user to enter an indication of the product. The user in this example next enters information regarding the product life, which may be a percentage of the expected shelf life that remains for the product.

[own] The user interface 22 in this example then prompts the user to select weather and traffic condition descriptors. The user next enters product stability information. Other characteristics are then suggested to the user including a choice of a supplier and a receiver. The user can then enter an expected or estimated arrival time. The processor 34 then determines possible carriers based on the user input and suggests potential carriers through the user interface 22 for the user to select.

The example characteristics in FIG. 3 include information regarding the carrier or shipping company, a supplier of the product, and a receiver. Locations of each of those indicate an origin and destination of the shipment. Other information, such as the mode of transportation, may also be entered by the user regarding a shipment and those skilled in the art will realize what information is useful for their particular situation. In this embodiment the user interface 22 prompts the user to provide the illustrated information in the illustrated shown.

A first portion 54 of the output in this example includes information determined by the processor 34 regarding any issue that is likely to occur during the shipment. The processor 34 determines a category that the identified issue fits within and the user is provided with an indication of the category along with an indication of the specific issue. Other potential issues within the same category are listed in a manner that allows the user to discern which of the issues in that category are likely and which are less of a potential concern. This additional information may assist the user in understanding the way in which one or more characteristics of the intended shipment contributes to the identified issue.

The first portion 54 may be populated at various times while the user provides the user input described above. For example, the processor 34 may determine that the combination of characteristics already entered by the user presents the possibility of an issue during the shipment. When that occurs in some embodiments the user interface 22 provides alternative characteristic options for the user to potentially select.

A second portion 56 of the output provides information regarding the estimated impact the identified issue will have on the shipment. In this example, the impact pertains to the life expectancy or shelf life of the product and the portion 56 provides impact information in terms of a percentage loss of the life expectancy. A third output portion 58 in this example provides indication of the impact in terms of time, such as the number of days of the life expectancy that may be lost during the shipment.

The impact information allows a user to determine whether making an alternative selection of at least one of the characteristics is considered necessary. The information at 54, 56 and 58 is updated each time the user makes such an alternative choice to allow the user to identify and select the best combination of characteristics for the intended shipment.

The processor 34 in some embodiments is configured to identify the primary characteristic that makes the most significant contribution to the identified issue. The processor 34 in such examples also determines at least one alternative characteristic that could replace the primary characteristic and provides a comparative impact on the product or shipment that the alternative characteristic may have. For example, if the carrier has a tendency to have temperature control issues on the route for the intended shipment the processor 34 may identify an alternative carrier from the information in the database 32 that has not experienced such temperature control issues and propose that carrier as an alternative. With the alternative carrier, the temperature control issue may be much less likely and have no or minimal impact on the product or shipment. Such information helps a user make an informed decision on how to configure the parameters or characteristics of an intended shipment to achieve an intended result.

Additionally, the input portion 24 of the user interface 22 allows the user to enter instructions to an appropriate entity involved in any portion of the shipment where an issue is likely to occur. For example, if the selected carrier has had issues with temperature control the user may enter special instructions regarding maintaining a desired temperature within a shipping container holding the product. Similarly, if the user wants a carrier to avoid a particular route such information may be entered by the user. The output in such embodiments includes an indication of such instructions and those are communicated to the appropriate persons involved in the shipment.

In an example embodiment, the processor 34 uses information from the database 32 regarding previous shipments having a combination of characteristics that are the same as or related to the characteristics provided by the user regarding the intended shipment. The database 32 also includes information regarding issues that occurred on the previous shipments, which the processor 34 uses to determine whether any issues are likely to occur on the intended shipment.

The processor 34 gathers information regarding shipments completed by carriers using vehicles, which may be trucks. Each shipment includes a product or cargo within at least one shipping container, such as a truck trailer. In some instances, the shipping container is a temperature-controlled container that includes a refrigeration unit to maintain a desired temperature within the container to establish desired conditions for the cargo within the container.

The processor 34 determines whether the combination of characteristics of any previous shipments indicates or corresponds to an identified issue that is one of a plurality of predetermined issues. For example, the database 32 includes information regarding issues that occurred during previous shipments. Examples of such issues include route distances that differ from an expected distance, delays in shipment, numbers of stops that differ from an expected number of stops for a particular shipment, delays or damage that occurs at a particular origin location or destination location, and differences between a temperature within the shipping container and a desired temperature for the particular cargo during the shipment. The database 32 may contain information that relates specific characteristics to particular issues or the processor 34 may be configured to determine such relationships. For example, the number of times a shipping container is opened can relate to issues regarding potential theft or inefficient performance of a refrigeration system. The number of stops or duration of time between the beginning and completion of a shipment relate to issues regarding shipping delays. The processor 34 is programmed or otherwise configured to identify when one of the predetermined issues occurred during a shipment based on the related or corresponding characteristics of that shipment and to relate that information to the characteristics of the intended shipment to identify the likelihood of the same or a similar issue occurring during the intended shipment.

Each time the processor 34 identifies one of the issues occurred or was implicated during a shipment, the processor 34 identifies that issue as an issue that is likely to occur on the intended shipment. That determination is based upon information regarding the determined characteristics from the previous shipment (or shipments) that includes the identified issue and information regarding corresponding characteristics of others of the plurality of shipments whose characteristics are stored in the database 32.

In an example embodiment, the processor 34 determines a probability for each identified issue based on a combination of the characteristics of the shipment that included the identified issue and characteristics of the shipments that include the same characteristic that indicates or corresponds to the identified issue.

For example, the processor 34 may determine that a particular shipment took longer than expected. By comparing other shipments between the same origin and destination, the processor 34 is able to make a determination regarding a probability that a future shipment between that origin and destination will involve a delay. This determination can be specific to each carrier within the supply chain. For example, the processor may determine a probability whether any or each of the carriers will experience such a delay. If the delay on a particular shipment is an anomaly compared to all other similar shipments recorded in the database 32, the probability of a delay in a future shipment is relatively low. If, on the other hand, the processor 34 determines that one or more of the carriers has experienced the same or a similar delay on multiple shipments between the same origin and destination, the processor determines a higher probability that such a delay will occur on a future shipment.

One aspect of the probability determination is that the processor 34 considers a variety of the characteristics that may have an impact on the particular issue. For example, the route taken by one carrier may differ from the route taken by another even though the origin and destination locations are the same. It is also possible that the receiving company at the destination location introduces a delay that is outside of the control of the shipper. The particular cargo or amount of cargo may also have an impact on whether a delay occurred. The processor 34 is programmed to account for a variety of different influences on the results of the shipment when determining the probability whether an issue will occur during the intended shipment.

When more than one issue is likely the processor 34 determines which of the issues are most likely to occur during the intended shipment based on the probabilities regarding the different identified issues.

In the example embodiment described above, some of the inputs are relatively straightforward and entered by the user and others are suggested by the system 20 through the user interface 22. Information such as the departure date, arrival date, and initial product life are examples of information the user will typically know without any prompting or suggestion. Examples of suggested characteristics include weather condition, product life or stability, and arrival time. Such characteristics are automatically populated and the user has the option of overwriting or changing them. Other suggested characteristics are suggested as an ordered list of options with the options less likely to have an associated issue or problem for the contemplated shipment presented as better or preferred options.

For example, based on the chosen product chosen the user interface 22 presents options for a supplier ordered from best to worst option. The user may choose a different one based on other factors, such as the cost of the goods. The system 20 suggests the best type of packing, the best carrier, and other characteristics to have minimal loss. Any of the suggested characteristics may be ignored by the user if the user has another preference. Throughout the process the user may be able to see the issues and impact that various combinations of shipment characteristics will have, which allows the user to make more informed shipment choices.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A method of advising a user regarding a potential shipment, the method comprising:

providing a temperature-controlled container that includes a refrigeration unit to maintain a desired temperature within the temperature-controlled container to establish desired conditions for a product within the temperature-controlled container that corresponds to the potential shipment;

receiving user input at a processor regarding at least one of a plurality of characteristics of the potential shipment;

suggesting others of the characteristics to the user through operation of the processor;

receiving additional user input to the processor based on a user selection of at least one of the suggested others;

determining, by the processor, whether the characteristics of the user input in combination indicate or correspond to at least one issue that is likely to occur during the shipment;

when there is at least one issue that is likely to occur during the shipment, determining, by the processor, an expected impact that the at least one issue will have on the shipment;

providing an output to the user indicating the determined expected impact, and wherein:

the plurality of characteristics includes at least two of an identity of a supplier, an identity of a carrier, an identity of a receiver, an indication of the product to be shipped, an origin and a destination of the shipment, a desired beginning date for the shipment, an expected completion date for the shipment, an indication of a mode of transportation, and at least one characteristic indicative of a life expectancy of the product based on a temperature of the product during the shipment;

the mode of transportation includes the temperature-controlled container that includes the refrigeration unit to maintain the desired temperature within the temperature-controlled container to establish desired conditions for the product within the temperature-controlled container;

the at least one issue includes the temperature of the product during the shipment;

the plurality of characteristics input by the user has a total number of characteristics;

determining whether the characteristics of the user input in combination indicate or correspond to at least one issue that is likely to occur during the shipment is performed by the processor multiple times before the total number of characteristics are included in the user input;

determining the expected impact that the at least one issue will have on the shipment is performed by the processor each time that at least one issue is determined;

providing the output to the user indicating the determined expected impact is performed by the processor each time that a change in the user input results in a change in the at least one issue and the expected impact to provide a plurality outputs to the user before the user makes a final selection of characteristics for the potential shipment; and wherein the method further comprises:

determining, by the processor, if there are temperature control issues on an initially selected route for the shipment, wherein the initially selected route comprises a route from an origin location to a destination location;

receiving further user input to the processor indicating instructions from the user for the shipment to address the at least one issue comprising the temperature of the product during the shipment;

controlling the temperature of the product during the shipment based on the instructions from the user to avoid the at least one issue during the shipment;

determining, by the processor, differences between a temperature within the temperature-controlled container and a desired temperature for the product during the shipment; and in an accordance with a determination that there is a difference between the temperature within the temperature-controlled container and the desired temperature for the product, controlling the refrigeration unit to maintain the desired temperature.

2. The method of claim 1, comprising:

determining a primary one of the characteristics that contributes most to the at least one issue; and providing an indication of the primary one of the characteristics in the output;

determining an alternative characteristic corresponding to the primary one of the characteristics, wherein the alternative characteristic reduces a likelihood for the at least one issue to occur during the shipment;

determining an alternative impact based on the alternative characteristic;

providing an indication of the alternative characteristic in the output;

providing an indication of the alternative impact in the output;

in accordance with a determination that there are temperature control issues with maintaining the desired temperature in the temperature-controller container for a selected carrier on an initially selected route for the shipment, identifying an alternative carrier that has not experienced such temperature control issues; and proposing the alternative carrier to the user to transport the shipment to the destination location.

3. The method of claim 1, wherein suggesting others of the characteristics comprises suggesting a plurality of options for each of the characteristics in a predetermined sequence of the characteristics; and receiving the additional user input for the each of the suggested characteristics occurs before suggesting the plurality of options for a next one of the characteristics in the predetermined sequence.

4. A system for advising a user regarding a potential shipment, the system comprising:

a temperature-controlled container that includes a refrigeration unit to maintain a desired temperature within the temperature-controlled container to establish desired conditions for a product within the temperature-controlled container that corresponds to the potential shipment; a database containing information regarding a plurality of shipments; a user interface configured to allow the user to enter user input including at least one of a plurality of characteristics of the potential shipment;

suggest others of the characteristics to the user; and allow the user to add to the user input by selecting at least one of the suggested others; and a processor that accesses the information in the database and the characteristics entered through the user input, the processor being configured to determine whether the characteristics of the user input in combination indicate or correspond to at least one issue that is likely to occur during the shipment;

when there is at least one issue that is likely to occur during the shipment, determine an expected impact that the at least one issue will have on the shipment; and provide an output to the user indicating the determined expected impact, and wherein:

the plurality of characteristics includes at least two of an identity of a supplier, an identity of a carrier, an identity of a receiver, an indication of the product to be shipped, an origin and a destination of the shipment, a desired beginning date for the shipment, an expected completion date for the shipment, an indication of a mode of transportation, and at least one characteristic indicative of a life expectancy of the product based on a temperature of the product during the shipment;

the mode of transportation includes the temperature-controlled container that includes the refrigeration unit to maintain the desired temperature within the temperature-controlled container to establish desired conditions for the product within the temperature-controlled container;

the at least one issue includes the temperature of the product during the shipment;

the plurality of characteristics input by the user has a total number of characteristics;

determining whether the characteristics of the user input in combination indicate or correspond to at least one issue that is likely to occur during the shipment is performed multiple times before the total number of characteristics are included in the user input;

determining the expected impact that the at least one issue will have on the shipment is performed each time that at least one issue is determined; and providing the output to the user indicating the determined expected impact is performed each time that a change in the user input results in a change in the at least one issue and the expected impact to provide a plurality outputs to the user before the user makes a final selection of characteristics for the potential shipment; and wherein the system is configured to:

determine, via the processor, if there are temperature control issues on an initially selected route for the shipment, wherein the initially selected route comprises a route from an origin location to a destination location;

receive further user input to the processor indicating instructions from the user for the shipment to address the at least one issue comprising the temperature of the product during the shipment;

control the temperature of the product during the shipment based on the instructions from the user to avoid the at least one issue during the shipment;

determine, via the processor, differences between a temperature within the temperature-controlled container and a desired temperature for the product during the shipment; and in an accordance with a determination that there is a difference between the temperature within the temperature-controlled container and the desired temperature for the product, control the refrigeration unit to maintain the desired temperature.

5. The system of claim 4, wherein the processor is configured to:

determine a primary one of the received characteristics that contributes most to the at least one issue;

provide an indication of the primary one of the received characteristics in the output;

determine an alternative characteristic corresponding to the primary one of the received characteristics, wherein the alternative characteristic reduces a likelihood for the at least one issue to occur during the shipment;

determine an alternative impact based on the alternative characteristic;

provide an indication of the alternative characteristic in the output;

provide an indication of the alternative impact in the output;

in accordance with a determination that there are temperature control issues with maintaining the desired temperature in the temperature-controller container for a selected carrier on an initially selected route for the shipment, identifying an alternative carrier that has not experienced such temperature control issues; and proposing the alternative carrier to the user to transport the shipment to the destination location.

6. The system of claim 4, wherein the processor is configured to determine a category that the at least one issue fits within;

provide an indication of the determined category in the output; and provide an indication of other potential issues that fit within the determined category.

7. The system of claim 4, wherein the user interface is configured to suggest the others of the characteristics by suggesting a plurality of options for each of the characteristics in a predetermined sequence of the characteristics; and receive the user input regarding the each of the suggested characteristics before suggesting the plurality of options for a next one of the characteristics in the predetermined sequence.

8. The system of claim 4, wherein the output comprises:

a first portion including information determined by the processor regarding any issue that may occur during the shipment, and wherein the processor determines a category for each identified issue and the user is provided with an indication of the category along with an indication of the identified issue;

a second portion that provides impact information regarding the expected impact the identified issue will have on the shipment, and wherein the impact information comprises the life expectancy or shelf life of the product; and a third output portion that provides an indication of the expected impact in terms of time.

9. The system of claim 8, wherein in accordance with a receipt of the impact information, a user determines whether to make an alternative selection of one or more of the characteristics, and wherein information associated with the first portion, the second portion, and the third portion is updated each time the user makes an alternative selection.

10. The system of claim 8, wherein the first portion is populated at various times while the user provides the user input, and wherein the processor repeatedly identifies any issue that may occur during the shipment and proposes alternative selections.

11. The system of claim 8, wherein the impact information of the second portion comprises a percentage loss of the life expectancy, and wherein the time of the third portion comprises a number of days of the life expectancy or shelf life that may be lost during the shipment.

12. The system of claim 8, wherein the output comprises a feedback loop that occurs multiple times as the user enters the characteristics and selects suggested characteristics until the user makes a final selection of a total number of characteristics for the shipment.

13. The method of claim 1, wherein the output comprises:

a first portion including information determined by the processor regarding any issue that may occur during the shipment, and wherein the processor determines a category for each identified issue and the user is provided with an indication of the category along with an indication of the identified issue;

a second portion that provides impact information regarding the expected impact the identified issue will have on the shipment, and wherein the impact information comprises the life expectancy or shelf life of the product; and a third output portion that provides an indication of the expected impact in terms of time.

14. The method of claim 13, wherein in accordance with a receipt of the impact information, a user determines whether to make an alternative selection of one or more of the characteristics, and wherein information associated with the first portion, the second portion, and the third portion is updated each time the user makes an alternative selection.

15. The method of claim 13, wherein:

the first portion is populated at various times while the user provides the user input, and wherein the processor repeatedly identifies any issue that may occur during the shipment and proposes alternative selections; and/ or wherein the impact information of the second portion comprises a percentage loss of the life expectancy, and wherein the time of the third portion comprises a number of days of the life expectancy or shelf life that may be lost during the shipment.

16. The method of claim 13, wherein the output comprises a feedback loop that occurs multiple times as the user enters the characteristics and selects suggested characteristics until the user makes a final selection of a total number of characteristics for the shipment.

17. The method of claim 1, wherein the plurality of characteristics includes at least the identity of the carrier in addition to maintaining the temperature of the product at the desired temperature during the shipment, and the method comprising:

identifying whether any carriers have temperature control issues with maintaining the desired temperature in the temperature-controlled container on the route, and if a selected carrier has temperature control issues on the route, identifying an alternative carrier that has not experienced such temperature control issues and proposing the alternative carrier to the user; and if the selected carrier that has had issues with temperature control is maintained by the user, prompting the user to enter special instructions regarding maintaining the desired temperature within the temperature-controller shipping container holding the product.

18. The system of claim 4, wherein the plurality of characteristics includes at least the identity of the carrier in addition to maintaining the temperature of the product at the desired temperature during the shipment, and wherein the system is configured to:

identify whether any carriers have temperature control issues with maintaining the desired temperature in the temperature-controlled container on the route, and if a selected carrier has temperature control issues on the route, identify an alternative carrier that has not experienced such temperature control issues and propose the alternative carrier to the user; and if the selected carrier that has had issues with temperature control is maintained by the user, prompt the user to enter special instructions regarding maintaining the desired temperature within the temperature-controller shipping container holding the product.

19. A system for advising a user regarding a potential shipment, the system comprising:

a temperature-controlled container that includes a refrigeration unit to maintain a desired temperature within the temperature-controlled container to establish desired conditions for a product within the temperature-controlled container that corresponds to the potential shipment;

a database containing information regarding a plurality of shipments;

a user interface configured to allow the user to enter user input including a plurality of characteristics of the potential shipment, wherein the plurality of characteristics includes at least an indication of the product to be shipped, an origin location and a destination location of the shipment, an indication of a mode of transportation that includes the temperature-controlled container, and at least one characteristic indicative of a life expectancy of the product based on a temperature of the product during the shipment; and a processor that accesses the information in the database and the plurality of characteristics entered through the user input, the processor being configured to:

determine possible carriers for the product based on the user input;

determine whether the plurality of characteristics of the user input in combination indicate or correspond to at least one issue that is likely to occur during the shipment, wherein the at least one issue includes the temperature of the product during the shipment, and when there is at least one issue that is likely to occur during the shipment, determine an expected impact that the at least one issue will have on the shipment;

provide an output to the user that includes the determined expected impact and suggestions of potential carriers through the user interface for the user to select; and wherein:

the output that is provided to the user regarding the determined expected impact is performed each time that a change in the user input results in a change in the at least one issue and the expected impact to provide a plurality outputs to the user before the user makes a final selection of characteristics for the potential shipment;

the processor determines if there are temperature control issues for the possible carriers on an initially selected route for the shipment, wherein the initially selected route comprises a route from the origin location to the destination location, and wherein the temperature control issues concern maintaining the desired temperature for the product in the temperature-controlled container on the route;

if an initially selected carrier has temperature control issues on the route, the processor identifies an alternative carrier that has not experienced such temperature control issues and proposes the alternative carrier to the user;

if the selected carrier that has had issues with temperature control is maintained by the user, the processor prompts the user to enter special instructions regarding maintaining the desired temperature within the temperature-controller container holding the product; and wherein the processor:

controls the temperature of the product during the shipment based on user input and instructions from the user to avoid the at least one issue during the shipment;

determines differences between a temperature within the temperature-controlled container and a desired temperature for the product during the shipment; and in an accordance with a determination that there is a difference between the temperature within the temperature-controlled container and the desired temperature for the product, control the refrigeration unit to maintain the desired temperature.

20. The system of claim 19, wherein the user makes a final selection for either the alternative carrier or the initially selected carrier, and instructions are communicated regarding the shipment such that the temperature of the temperature-controlled container is configurable to control the refrigeration unit to maintain the desired temperature for the product.

* * * * *